Patented Dec. 29, 1953

2,664,442

UNITED STATES PATENT OFFICE 2,664,442

PROCESS FOR THE PURIFICATION OF PERCHLOROMETHYL MERCAPTAN

Jonas Kamlet, Easton, Conn., assignor to Mathieson Chemical Corporation, a corporation of Virginia No Drawing. Application December 27, 1950, Serial No. 203,030

4 Claims. (Cl. 260—543)

My invention relates to an improvement in the manufacture of perchloromethyl mercaptan. More particularly, it relates to an improved process whereby perchloromethyl mercaptan can be manufactured from cheap and readily available raw materials, in good yields, and thereafter separated from noisome and undesirable concomitant by-products by a simple and expeditious method. It provides a convenient and practical process for the manufacture of perchloromethyl mercaptan, with a minimum yield of by-product carbon tetrachloride, and for the separation of the resultant perchloromethyl mercaptan from the undesirable concomitant sulfur monochloride and sulfur dichloride.

Perchloromethyl mercaptan—$CCl_3SCl$—is a yellow, malodorous liquid boiling at 146.5°–148.0° C./760 mm. Hg pressure, of density of 1.70–1.72, refractive index—$n_D^{20}$—1.5484. It has derived commercial importance in the past several years as an intermediate in the manufacture of diesel fuel additives, and in the manufacture of fungicides.

Perchloromethyl mercaptan has heretofore been prepared by several methods. However, by far the most practical method for the preparation of perchloromethyl mercaptan involves the reaction of carbon bisulfide with chlorine in the presence of an iodine catalyst and preferably in the absence of sunlight or actinic radiations (Rathke, Annalen 167, 198 (1873); Klason, German Patent 83,124; Organic Syntheses Collective Volume I, 506–510; Johnson and Hemigway, Journ. Amer. Chem. Soc. 38, 1554 (1916); Frankland, Challenger and Webster, Journ. Soc. Chem. Ind., 39, 257 T (1920); Dyson and Hunter, Journ. Soc. Chem. Ind. 45, 81 T (1926); Dyson and George, Journ. Chem. Soc. (London) 125, 1703 (1924); Autenrieth and Hefner, Berichte 58, 2152 (1925); Helfrich and Reid, Journ. Amer. Chem. Soc., 43, 591 (1921).

The reactions involved in the iodine-catalyzed chlorination of carbon bisulfide are:

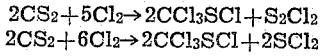

An undesirable side-reaction may give rise to carbon tetrachloride at the expense of perchloromethyl mercaptan formation, e. g.

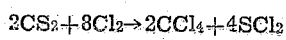

The presence of an iodine catalyst and temperatures below 30° C. favor the first two reactions yielding perchloromethyl mercaptan. Temperatures over 30° C., and sunlight or actinic radiations favor the undesirable second reaction yielding carbon tetrachloride. The preparation of perchloromethyl mercaptan is therefore effected by chlorinating carbon bisulfide in the presence of an iodine catalyst, or other suitable catalyst, at a temperature below 30° C., and in the dark or in the presence of indirect light.

At the conclusion of the chlorination, the reaction mixture consists of perchloromethyl mercaptan and a mixture of sulfur monochloride $S_2Cl_2$ and sulfur dichloride —$SCl_2$. With a properly conducted chlorination, most of the by-product will consist of the former, i. e., sulfur monochloride. A small amount of carbon tetrachloride will also be formed in each chlorination mixture.

Carbon tetrachloride boils at 77° C., sulfur dichloride boils at 59° C., sulfur monochloride boils at 136° C. and perchloromethyl mercaptan boils at 146.5° C. Thus, the boiling points of the sulfur monochloride and the perchloromethyl mercaptan are too close to permit an adequate separation of the two compounds. In addition, there is evidence of a tendency for the two to distill over together in an eutectic mixture, which further complicates the problem of separating the compounds.

Heretofore, it has been customary to separate the perchloromethyl mercaptan from the concomitant sulfur chloride by decomposing the latter with water or steam, and steam-distilling from the decomposition products. This procedure is quite unsatisfactory on a commercial scale operation. The decomposition of sulfur monochloride by treatment with steam is quite difficult. Large volumes of distillate, badly contaminated with the excessively malodorous perchloromethyl mercaptan and the sulfur chloride decomposition products, must be disposed of and create a serious waste pollution problem in a chemical plant. The steam distillation also serves to decompose part of the perchloromethyl mercaptan formed, and also removes a considerable amount of the volatile perchloromethyl mercaptan in the distillate, thus lowering the overall yield of this end-product. The noisome, toxic and dangerous properties of perchloromethyl mercaptan are well known; it has been proposed for use as a toxic agent in military gas warfare (Meyer—Der Gas Kampf und die Chemische Kampfstoffe (Leipzig 1926), pg. 404). Any process involving the disposal of large volumes of a perchloromethyl mercaptan-contaminated off-water or steam condensate is therefore undesirable and highly disadvantageous. My invention provides a simple method for treating the chlorination product (i. e. the reaction mixture obtained by chlorinating carbon bisulfide in the presence of an iodine catalyst at a temperature below 30° C.) so as to obviate and avoid the necessity of separating the perchloromethyl mercaptan from concomitant sulfur chlorides.

The basis of the present invention is my discovery that sulfur trioxide will react with the sulfur chloride components of the reaction mixture preferentially, at a temperature below 90° C., according to the following equations:

$$S_2Cl_2 + SO_3 \rightarrow SOCl_2 + S + SO_2$$
$$2SCl_2 + 2SO_3 \rightarrow 2SOCl_2 + 2SO_2$$

This reaction proceeds substantially quantitatively, with the evolution of sulfur dioxide. The thionyl chloride formed boils at 78° C. Thus, the reaction mixture, after the addition of the requisite amount of sulfur trioxide, will consist of thionyl chloride (B. Pt. 78° C.), small amounts of carbon tetrachloride (B. Pt. 77° C.), small amounts of sulfur (which is not volatile at the low temperatures involved), and a predominant amount of perchloromethyl mercaptan (B. Pt. 146.5° C.). Thus, the lower boiling thionyl chloride and carbon tetrachloride are very readily removed by distillation, and the perchloromethyl mercaptan can be separated in excellent yield from the residual reaction mixture by simple distillation. By reacting the high-boiling sulfur monochloride with sulfur trioxide, it is converted to the low-boiling thionyl chloride and volatile, gaseous sulfur dioxide, which are thereafter easily separated from the perchloromethyl mercaptan by a simple process of fractional distillation.

The amount of sulfur trioxide added to the carbon bisulfide chlorination mixture, i. e. the end-product mixture of perchloromethyl mercaptan and sulfur chlorides, depends somewhat upon the composition of the end-product mixture. However, best results are obtained by adding one-half mole of sulfur trioxide per one mole of the original carbon bisulfide used. The sulfur trioxide is preferably added to the reaction mixture at a temperature below 90° C. The sulfur trioxide may be introduced in any convenient manner; as gas from a contact sulfuric acid converter, as gas evolved by the heating of fuming sulfuric acid, as the stable solid alpha-form (M. Pt. 62.3° C.), as the meta-stable asbestos-like beta-form (M. Pt. 32.5° C.) as the meta-stable liquid or ice-like gamma-form (M. Pt. 16.8° C.), or as any convenient form or mixtures of forms or as a compound or a mixture of compounds yielding sulfur trioxide under the conditions of the reaction, e. g. alkali metal pyrosulfate, alkali metal chlorosulfonate, dioxane-SO₃ adduct, etc.

The overall reaction, after the addition of the sulfur trioxide to the chlorinated carbon bisulfide, may therefore be given as:

$$2CS_2 + 5Cl_2 + SO_3 \rightarrow 2CCl_3SCl + SOCl_2 + S + SO_2$$

The temperature at which the sulfur trioxide is reacted with the mixture of perchloromethyl mercaptan and sulfur chloride is not critical, so long as it is maintained below 90° C., at which point undesirable side-reactions commence to take place. By adding the sulfur trioxide at a low temperature, and warming the reaction mixture gently, or permitting the exothermic reaction to proceed, the reaction temperature may be maintained in the vicinity of the refluxing temperature of the thionyl chloride-carbon tetrachloride mixture formed, until substantially all of the sulfur trioxide has been added, all of the sulfur dioxide formed has been evolved and the sulfur chlorides are completely reacted and consumed. The thionyl chloride-carbon tetrachloride mixture will reflux at 75–80° C.

The following example is given to illustrate the present invention, but in no way to limit it to reagents, proportions or conditions described therein.

In a suitable reaction flask fitted with thermometer, chlorine diffuser plate, reflux condenser with fractionating column, place 722 grams of carbon bisulfide (575 cc.) and 2.9 grams of iodine (the usual amount of iodine catalyst employed is 0.3%–0.4% of the weight of the carbon disulfide). The temperature of the mixture is brought down to 0°–5° C. by external cooling with an ice-salt mixture and chlorine is introduced through the diffuser plate in a rapid stream, at such a rate as to maintain the temperature of the cooled reaction mixture below 30° C., and preferably at 15°–20° C. The chlorine is taken up quite rapidly. The chlorination is effected in the dark, or in the presence of diffused light, and is continued until the reaction mixture has reached a volume of about 1290 cc. (i. e. 2.0 to 2.25 times the volume of the original reaction mixture). The dark-colored reaction mixture is then allowed to stand overnight.

The following day, add about 50 grams of sulfur trioxide (e. g. "Sulfan") to the reaction mixture, and allow the reaction mixture to come to a gentle reflux. Now continue adding the sulfur trioxide in small portions to the reaction mixture at such a rate as to maintain it under gentle reflux, and a total of 400 grams of sulfur trioxide (5 moles) has been added. Continue refluxing the reaction mixture for 30 minutes, then distill off the fractions coming over at 100° C. at atmospheric pressure. During the refluxing period, there will be a copious evolution of sulfur dioxide, which is led off through the reflux condenser and fractionating column, and absorbed in an alkali solution.

The residue in the flask, after distilling off the low-boiling carbon tetrachloride and thionyl chloride, is then distilled under reduced pressure, the fraction coming over at 72°–73° C. at 50 mm. Hg pressure being pure perchloromethyl mercaptan. The yield of perchloromethyl mercaptan is 1525 grams, or about 82% of the theoretical. On a commercial scale operation, the considerable quantities of thionyl chloride obtained as a by-product can be disposed of as a profitable by-product.

I claim:

1. In the production of perchloromethyl mercaptan by chlorination of carbon bisulfide, the improvement which comprises reacting the reaction mixture obtained by the chlorination of the carbon bisulfide with sulfur trioxide at a temperature not in excess of about 90° C., and recovering perchloromethyl mercaptan by distillation.

2. The process of claim 1 where the total amount of sulfur trioxide added to the chlorination reaction mixture is at least about 0.5 moles per 1.0 moles of carbon bisulfide originally employed.

3. In the production of perchloromethyl mercaptan by chlorination of carbon bisulfide, the improvement which comprises reacting the reaction mixture obtained by the chlorination of the carbon bisulfide with sulfur trioxide at a temperature not in excess of about 90° C., refluxing the resulting reaction mixture until the evolution of sulfur dioxide is substantially complete, and separating substantially pure perchloromethyl mercaptan by fractional distillation of the reaction mixture remaining after refluxing.

4. The process of claim 3 where the total amount of sulfur trioxide added to the chlorination reaction mixture is at least about 0.5 moles per 1.0 moles of carbon bisulfide originally employed.

JONAS KAMLET.

References Cited in the file of this patent

UNITED STATES PATENTS

| Number | Name | Date |
| --- | --- | --- |
| 2,362,057 | Edwards | Nov. 7, 1944 |
| 2,545,285 | Kamlet | Mar. 13, 1951 |

FOREIGN PATENTS

| Number | Country | Date |
| --- | --- | --- |
| 323,727 | Italy | Jan. 4, 1935 |

OTHER REFERENCES

Mellor: "Comprehensive Treatise on Inorganic and Theoretical Chemistry," vol. 10 (1930), page 640.